United States Patent
Liu et al.

(10) Patent No.: US 11,836,222 B2
(45) Date of Patent: Dec. 5, 2023

(54) METHOD AND APPARATUS FOR OPTIMIZING RECOMMENDATION SYSTEM, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Lihang Liu, Beijing (CN); Xiaomin Fang, Beijing (CN); Fan Wang, Beijing (CN); Jingzhou He, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 517 days.

(21) Appl. No.: 17/083,704

(22) Filed: Oct. 29, 2020

(65) Prior Publication Data
US 2021/0397901 A1    Dec. 23, 2021

(30) Foreign Application Priority Data
Jun. 18, 2020    (CN) .......................... 202010561785.5

(51) Int. Cl.
*G06Q 30/00* (2023.01)
*G06F 18/21* (2023.01)
(Continued)

(52) U.S. Cl.
CPC ...... *G06F 18/2178* (2023.01); *G06F 16/9535* (2019.01); *G06F 18/2193* (2023.01);
(Continued)

(58) Field of Classification Search
CPC ............. G06F 18/2178; G06F 16/9535; G06F 18/2193; G06N 20/00; G06N 3/126;
(Continued)

(56) References Cited

U.S. PATENT DOCUMENTS

2001/0053991 A1* 12/2001 Bonabeau .............. G06Q 10/06
                                                                     705/7.17
2017/0061286 A1*  3/2017 Kumar ............... G06Q 30/0269

FOREIGN PATENT DOCUMENTS

| JP | 2008009805 A | 1/2008 |
| JP | 2019028899 A | 2/2019 |
| JP | 2020027517 A | 2/2020 |

OTHER PUBLICATIONS

Y. Hou, Y.-S. Ong, L. Feng and J. M. Zurada, "An Evolutionary Transfer Reinforcement Learning Framework for Multiagent Systems," in IEEE Transactions on Evolutionary Computation, vol. 21, No. 4, pp. 601-615, Aug. 2017, doi: 10.1109/TEVC.2017.2664665. (Year: 2017).*

(Continued)

*Primary Examiner* — Maria V Vanderhorst
(74) *Attorney, Agent, or Firm* — Brooks Kushman P.C.

(57) ABSTRACT

A method and apparatus for optimizing a recommendation system, a device and a computer storage medium are described, which relates to the technical field of deep learning and intelligent search in artificial intelligence. A specific implementation solution is: taking the recommendation system as an agent, a user as an environment, each recommended content of the recommendation system as an action of the agent, and a long-term behavioral revenue of the user as a reward of the environment; and optimizing to-be-optimized parameters in the recommendation system by reinforcement learning to maximize the reward of the environment. The present disclosure can effectively optimize long-term behavioral revenues of users.

12 Claims, 4 Drawing Sheets

(51) Int. Cl.
*G06N 20/00* (2019.01)
*G06F 16/9535* (2019.01)
*G06Q 30/0207* (2023.01)
*G05B 19/418* (2006.01)
*G06Q 30/0601* (2023.01)

(52) U.S. Cl.
CPC ......... *G06N 20/00* (2019.01); *G06Q 30/0221* (2013.01); *G06Q 30/0225* (2013.01); *G06Q 30/0631* (2013.01)

(58) Field of Classification Search
CPC ...... G06N 3/006; G06N 7/01; G06Q 30/0221; G06Q 30/0225; G06Q 30/0631; G06Q 30/0251
See application file for complete search history.

(56) References Cited

OTHER PUBLICATIONS

Developing Multi-Task Recommendations with Long-Term Rewards via Policy Distilled Reinforcement Learning, by Xi Liu et. al (Year: 2020).*
Reinforcement Learning Applications by Yuxi Li (Year: 2019).*
"A Deep Reinforcement Learning Approach to Proactive Content Pushing". IEEE. Jan. 1, 2019 (Year: 2019).*
Extended European Search Report of European Application No. 21163211.2 dated Sep. 10, 2021, 9 pagse.
Chen et al., "Top-K Off-Policy Correction for a Reinforce Recommender System", Web Search and Data Mining, ACM, 2 Penn Plaza, Suite 701 New York, NY 10121-0701 USA, Jan. 30, 2019, pp. 456-464, XP058424874, DOI:10.1145/3289600.3290999, ISBN: 978-1-4503-5940-5.
Paras, "Reinforcement learning without gradients: evolving agents using Genetic Algorithms", Jan. 7, 2019, pp. 1-3, XP055836990, Retrieved from the Internet: URL: https://towardsdatascience.com/reinforcement-learning-without-gradients-evolving-agents-using-genetic-algorithms-8685817d84f [retrieved on Sep. 2, 2021].
Request for the Submission of an Opinion of Korean application No. 10-2021-0076843 dated Aug. 29, 2023, 10 pages.
Real et al., Automatic Production Through Evolutionary Search Using Machine Learning Algorithms, AUTOML Zero, Apr. 9, 2020, 4 pages.

* cited by examiner

METHOD AND APPARATUS FOR OPTIMIZING RECOMMENDATION SYSTEM, DEVICE AND COMPUTER STORAGE MEDIUM

CROSS-REFERENCE TO RELATED APPLICATIONS

The present application claims the priority of Chinese Patent Application No. 2020105617855, filed on Jun. 18, 2020, with the title of "Method and apparatus for optimizing recommendation system, device and computer storage medium". The disclosure of the above applications is incorporated herein by reference in its entirety.

TECHNICAL FIELD

The present disclosure relates to the field of computer application technology, and particularly to the field of deep learning and intelligent search technology in artificial intelligence.

BACKGROUND

Recommendation systems have been widely used in various fields, such as search platforms, information platforms, shopping platforms, music platforms, and so on. For platform services, how to recommend content to users in line with their preferences is critical to user experience and user retention.

Regardless of users or service providers (i.e., platforms), the long-term behavioral revenues such as total time spent by the users in using a service, the total number of clicks of the users on the platforms, and promotion conversion rates of the users on the platforms are all very important. However, the current recommendation system cannot effectively optimize the long-term behavioral revenues of the users.

SUMMARY

In view of this, the present disclosure discloses a method and apparatus for optimizing a recommendation system for long-term behavioral revenues of users, a device and a computer storage medium.

In a first aspect, the present disclosure provides a method for optimizing a recommendation system, comprising: taking the recommendation system as an agent, a user as an environment, each recommended content of the recommendation system as an action of the agent, and a long-term behavioral revenue of the user as a reward of the environment; and optimizing to-be-optimized parameters in the recommendation system by reinforcement learning to maximize the reward of the environment.

In a second aspect, the present disclosure further provides an apparatus for optimizing a recommendation system, comprising: a modeling unit configured to take the recommendation system as an agent, a user as an environment, each recommended content of the recommendation system as an action of the agent, and a long-term behavioral revenue of the user as a reward of the environment; and an optimization unit configured to optimize to-be-optimized parameters in the recommendation system by reinforcement learning to maximize the reward of the environment.

In a third aspect, the present disclosure provides an electronic device, comprising: at least one processor; and a memory in a communication connection with the at least one processor, wherein the memory stores instructions executable by the at least one processor, and the instructions are executed by the at least one processor to enable the at least one processor to perform the method described above.

In a fourth aspect, the present disclosure further provides a non-transitory computer-readable memory medium that stores computer instructions, wherein the computer instructions are used to make the computer perform the method described above.

It can be seen from the above technical solutions that the present disclosure can effectively optimize long-term behavioral revenues of users by reinforcement learning.

Other effects of the above optional manners will be explained below in combination with specific embodiments.

BRIEF DESCRIPTION OF THE DRAWINGS

The accompanying drawings are intended to better understand the solutions and do not limit the present disclosure. In the drawings.

DETAILED DESCRIPTION

Exemplary embodiments of the present disclosure are described below with reference to the accompanying drawings, including various details of the embodiments of the present disclosure to facilitate understanding, and they should be considered as exemplary only. Therefore, those of ordinary skill in the art should be aware that the embodiments described here may be changed and modified in various ways without deviating from the scope and spirit of the present disclosure. Similarly, for the sake of clarity and simplicity, descriptions of well-known functions and structures are omitted in the following description.

A conventional recommendation system generally employs a supervised algorithm, or a combination of a supervised algorithm and artificial rules.

After supervised algorithm training, the recommendation system can well predict and maximize current revenue of users. For example, content that a user likes is recommended, so as to improve a thumb up rate, a click rate and browsing time of the user for the current recommended content. However, the supervised algorithm may greedily recommend the content that the user likes, which easily leads to singleness of the recommended content, easily bothers the user, and is not conducive to improving the long-term behavioral revenue of the user.

However, the artificial rules are used to cover targets that cannot be directly optimized by the supervised algorithm or to make up for the deficiencies of the algorithm. The artificial rules are more controllable. For example, content proportions of different categories may be added to the artificial rules to ensure the diversity of the recommended content. At the same time, the artificial rules require no training and allow for faster login. Also, in a recommendation scenario, there is generally millions and billions of levels of content, and the artificial rules run faster. However, the artificial rules are one-sided and inefficient. On the one hand, with the upgrade of the recommendation system, the artificial rules may become more and more responsible and difficult to analyze. On the other hand, the artificial rules need to constantly select super-parameters by means of online A/B tests, which is costly and may expire with user or system updates and cannot be automatically updated.

In view of this, the core idea of the present disclosure is to optimize parameters in the recommendation system by reinforcement learning, so as to maximize long-term behavioral revenues of users.

Figure 1:
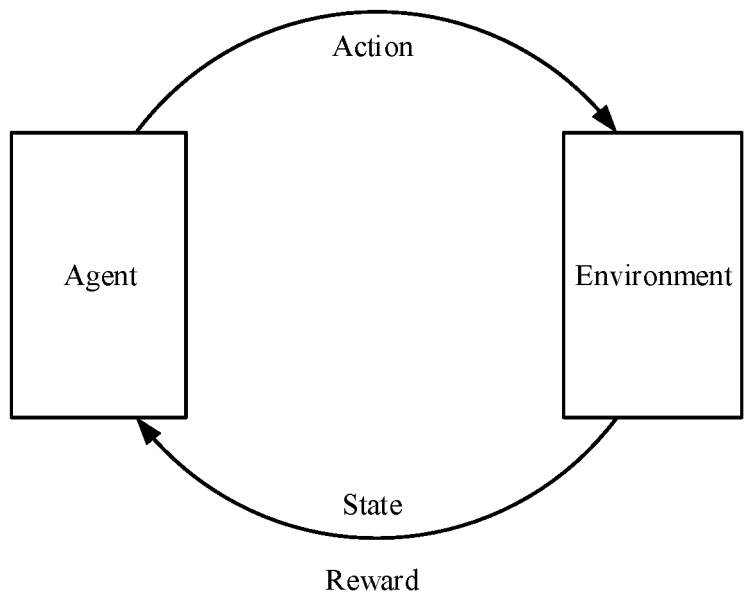
FIG. 1 is a schematic diagram of a typical reinforcement learning system.

FIG. 1 is a schematic diagram of a typical reinforcement learning system. As shown in FIG. 1, generally, the reinforcement learning system includes an agent and an environment. The agent constantly learns and optimizes its policies through interaction and feedback with the environment. Specifically, the agent observes and obtains a state of the environment, and determines, according to a certain policy, an action to be taken for the current state of the environment. When such a behavior acts on the environment, the state of the environment may be changed, and at the same time, a feedback is generated to the agent. The feedback is also known as a reward. The agent determines according to the obtained reward whether a previous action is correct and whether the policy needs to be adjusted, and then updates its policy. By repeatedly determining actions and receiving rewards, the agent may constantly update the policy. An ultimate goal is to learn a policy and maximize the accumulation of the obtained rewards.

Figure 2:
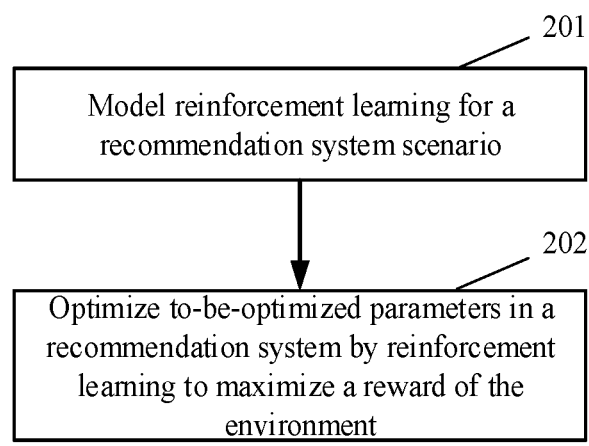
FIG. 2 is a flow chart of a method for optimizing a recommendation system according to an embodiment of the present disclosure.

FIG. 2 is a flow chart of a method for optimizing a recommendation system according to an embodiment of the present disclosure. The method may be performed by an apparatus for optimizing a recommendation system. The apparatus may be an application for maintaining a server, or a functional unit such as a plug-in or Software Development Kit (SDK) in a server-side application, or a computer terminal with strong computing power, which is not specifically limited in the embodiment of the present disclosure. As shown in FIG. 2, the method may include the following steps:

In 201, reinforcement learning is modeled for a recommendation system scenario.

It specifically includes: taking the recommendation system as an agent, a user as an environment, each recommended content of the recommendation system as an action of the agent, and a long-term behavioral revenue of the user as a reward of the environment.

In the embodiment of the present disclosure, the long-term behavioral revenue of the user reflects a long-term preference of the user, which may include, but is not limited to, the following:

The first is total time spent by the user in using a service to which the recommendation system belongs. For example, for a video service platform, if video is recommended to the user through the recommendation system, the total time spent by the user in using the video service can reflect the long-term behavioral revenue of the user.

The second is the total number of clicks or the total click rate of the user for the content recommended by the recommendation system. For example, for an information service platform, if consultation is recommended to the user through the recommendation system, the number of clicks and a click rate of the user for the recommended consultation can reflect the long-term behavioral revenue of the user.

The third is a promotion conversion rate of the user in the recommendation system. For example, for a video service platform, video is recommended to the user through the recommendation system, and some promotional content (such as advertisements) may be inserted during video recommendation. If the user clicks the promotion content and is redirected to the corresponding promotion page, promotion conversion is generated. A promotion conversion rate generated based on this also reflects the long-term behavioral revenue of the user to a large extent.

The fourth is a user retention rate for the service to which the recommendation system belongs. For example, for a video service platform, 10,000 users used the video service platform in the previous period, only 5,000 of the 10,000 users also used the video service platform in the current period, and then the retention rate is 0.5. The length of the period may be a day scale, a week scale, a month scale, etc. The user retention rate can also reflect the long-term behavioral revenue of the user.

The present disclosure is not limited to the type of models employ by to-be-optimized recommendation systems. Most recommendation systems employ a sorting model obtained through supervised learning training, and determine content recommended to users based on scores of ranking of the candidate content by the sorting model. Alternatively, it may be a sorting model using supervised learning training combined with artificial rules. A recommendation system obtained by training in this way is further optimized by reinforcement learning, so that the recommendation system does not have to bear the cost of cold startup, and the damage to user experience is also reduced.

In 202, to-be-optimized parameters in the recommendation system are optimized by reinforcement learning to maximize the reward of the environment.

In the embodiment of the present disclosure, all model parameters and/or hyper-parameters in the recommendation system may be optimized. Since the recommendation system includes a multi-layer structure, such as a recall layer and a sorting layer, which may also be more granular layers. Parameters of some layers can have a relatively great influence on results of the recommendation system, while some have a small influence. It is also possible to optimize some of the model parameters and/or hyper-parameters according to degrees of importance. For example, some model parameters and/or super parameters that have a relatively great influence on the results of the recommendation system may be selected for optimization, so as to reduce the amount of calculation during the optimization on the premise of ensuring an optimization effect.

The reinforcement learning in the present disclosure may employ, but is not limited to, evolutionary learning, DQN (Deep Q-learning), Policy Gradient, etc.

Figure 3:
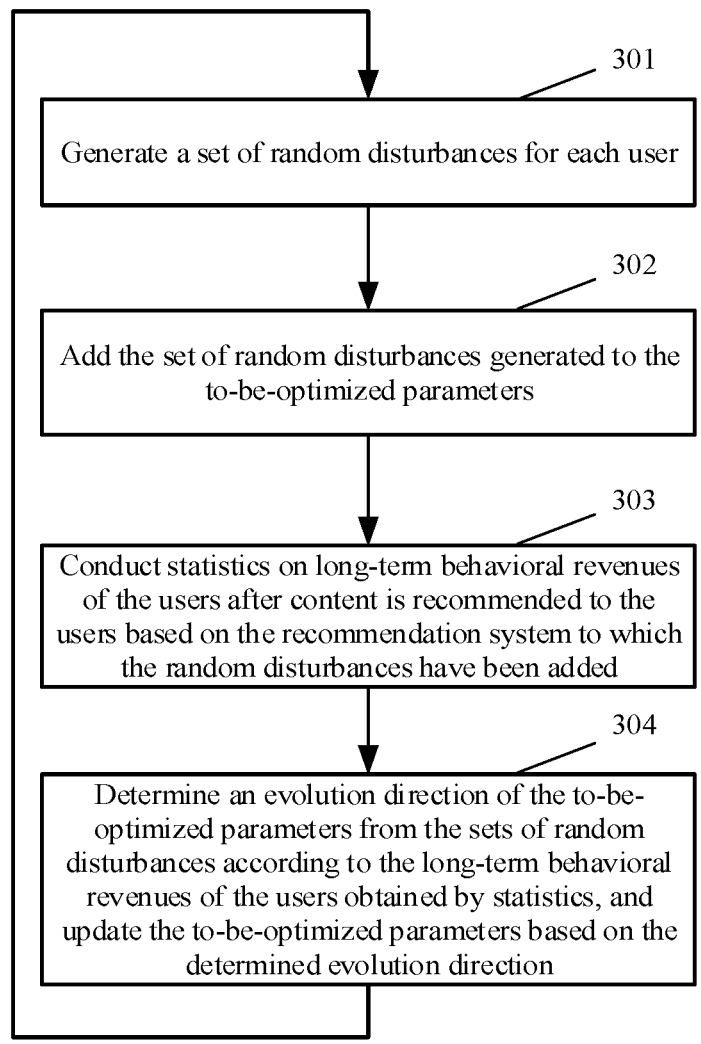
FIG. 3 is a flow chart of a method for iterative update during evolutionary learning according to an embodiment of the present disclosure.

Evolutionary learning is a technology in Black BoX Optimization, which belongs to a branch of reinforcement learning. An implementation mode of this step is described in detail herein by taking evolutionary learning as an example. In the process of evolutionary learning, more than one round of iterative update, that is, a plurality of rounds of iterative updates, is performed in a loop. As shown in FIG. 3, each round of iterative update may include the following steps:

In 301, a set of random disturbances for each user is generated.

If there are m users, m sets of random disturbances are generated, and each set of random disturbances corresponds to one user. The random disturbance of the $i^{th}$ user is expressed as $\vec{\varepsilon}_i$, which is a set of vectors. The random disturbances may be, for example, Gaussian noise, etc.

In 302, the set of random disturbances generated is added to the to-be-optimized parameters.

If a set of the to-be-optimized parameters in the recommendation system is expressed as $\vec{\theta}$, a disturbance is added to each parameter in the set of parameters, and the added random disturbance has the same dimension as the to-be-optimized parameter. For example, if a to-be-optimized parameter is n-dimension, an added random disturbance is also n-dimension.

In 303, statistics is conducted on long-term behavioral revenues of the users after content is recommended to the users based on the recommendation system to which the random disturbances have been added.

The iterative updates are actually an online "trial-and-error" process, in which content is recommended to the users online based on the recommendation system to which the random disturbances have been added and how to optimize the parameters are determined based on rewards generated user states. Therefore, after the random disturbances are added, long-term behavioral revenues of users, for example, m users, and random disturbances generated for the m users may be collected. It is assumed that the long-term behavioral revenue of the $i^{th}$ user is expressed as $r_i$.

In 304, an evolution direction of the to-be-optimized parameters is determined from the sets of random disturbances according to the long-term behavioral revenues of the users obtained by statistics, and the to-be-optimized parameters are updated based on the determined evolution direction. Then, the method proceeds to step 301 for loop iteration.

In this step, an optimal evolution direction is actually maximized by attempting disturbances in various directions so as to maximize the long-term behavioral revenues of the users.

For example, the to-be-optimized parameters are updated according to the following formula:

$$\vec{\theta} \leftarrow \vec{\theta} + \alpha \frac{1}{m} \sum_i^m r_i * \vec{\varepsilon}_i$$

wherein α denotes an update step length. The value of the step length may be a preset value, such as a trial value or an empirical value.

The iterative updates may be performed in a loop, which may be a continuous process. That is, iterative optimization is constantly performed as the recommendation system recommends content to the users online. However, since the parameters are actually gradually optimized after constant iterative optimization, the degree of optimization is already low. Continuous optimization of parameters is required only because some user states and social states change. Therefore, a learning rate of evolutionary learning can be reduced. A specific value of the learning rate may be a trial value or an empirical value.

It is also possible to stop iterative update after the iterative update reaches a certain extent and perform the iterative update in a loop next time the iteration update is started, until it reaches a certain extent. The certain extent may be that the recommendation system meets a convergence condition, for example, the long-term behavioral revenue of the user gradually converges; or may be that the number of alternate rounds reaches a preset round number threshold.

The manner provided in the above embodiment has the following advantages:

1) The recommendation system can be optimized for long-term behavioral revenues of users by reinforcement learning. In other words, the long-term behavioral revenues of the users are directly taken as an optimization target to ensure that the recommendation system keeps evolving along the direction of the growth of the long-term behavioral revenues of the users.
2) Compared with supervised learning that requires a mature deep learning framework for training, reinforcement learning costs less and only requires simple data processing and mathematical calculation.
3) Reinforcement learning does not need to know a specific model structure inside the recommendation system, but processes the recommendation system as a "black box", which greatly reduces the difficulty of login.
4) User experience may not be greatly affected each time evolutionary learning explores a parameter space around current parameters and selects an evolution direction based on this.
5) At present, most recommendation systems employ a supervised learning model combined with artificial rules, in which, based on reinforcement learning, an original supervised learning model structure does not need to be replaced with another model structure, but the original model structure is directly retained, parameters therein are added to optimization parameters of reinforcement learning, and a recommendation system that values short-term revenues is slowly evolved to a recommendation system that values long-term revenues.

The above is a detailed description of the method provided in the present disclosure. The apparatus provided in the present disclosure is described in detail below with reference to embodiments.

Figure 4:
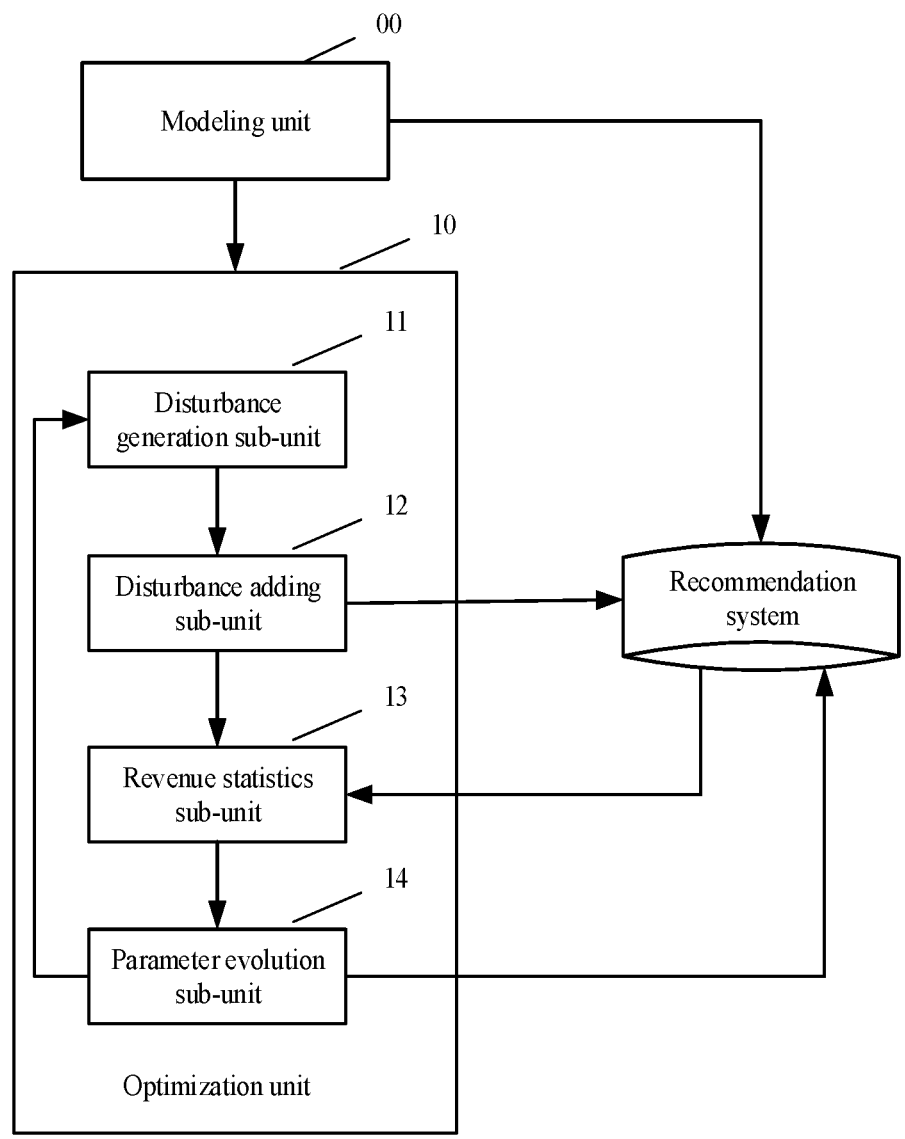
FIG. 4 is a structural diagram of an apparatus for optimizing a recommendation system according to an embodiment of the present disclosure.

FIG. 4 is a structural diagram of an apparatus for optimizing a recommendation system according to an embodiment of the present disclosure. As shown in FIG. 4, the apparatus may include: a modeling unit 00 and an optimization unit 10. Main functions of each component unit are as follows:

The modeling unit 00 is configured to take the recommendation system as an agent, a user as an environment, each recommended content of the recommendation system as an action of the agent, and a long-term behavioral revenue of the user as a reward of the environment.

The long-term behavioral revenue of the user may include, but is not limited to, total time spent by the user in using a service to which the recommendation system belongs, the total number of clicks or the total click rate of the user for the content recommended by the recommendation system, a promotion conversion rate of the user in the recommendation system, or a user retention rate for the service to which the recommendation system belongs.

The optimization unit 10 is configured to optimize to-be-optimized parameters in the recommendation system by reinforcement learning to maximize the reward of the environment.

In the embodiment of the present disclosure, all model parameters and/or hyper-parameters in the recommendation system may be optimized. Since the recommendation system includes a multi-layer structure, such as a recall layer and a sorting layer, which may also be more granular layers.

Parameters of some layers can have a relatively great influence on results of the recommendation system, while some have a small influence. It is also possible to optimize some of the model parameters and/or hyper-parameters according to degrees of importance. For example, some model parameters and/or super parameters that have a relatively great influence on the results of the recommendation system may be selected for optimization, so as to reduce the amount of calculation during the optimization on the premise of ensuring an optimization effect.

The reinforcement learning in the present disclosure may employ, but is not limited to, evolutionary learning, DQN (Deep Q-learning), Policy Gradient, etc.

If the reinforcement learning employs evolutionary learning, the optimization unit 10 may specifically include a disturbance generation sub-unit 11, a disturbance adding sub-unit 12, a revenue statistics sub-unit 13 and a parameter evolution sub-unit 14 to perform more than one round of iterative update.

In each round of iterative update, the disturbance generation sub-unit 11 is configured to generate a set of random disturbances for each user.

The disturbance adding sub-unit 12 is configured to add the set of random disturbances to the to-be-optimized parameters, the added random disturbances having the same dimension as the to-be-optimized parameters.

The revenue statistics sub-unit 13 is configured to conduct statistics on long-term behavioral revenues of the users after content is recommended to the users based on the recommendation system to which the random disturbances have been added.

The parameter evolution sub-unit 14 is configured to determine an evolution direction of the to-be-optimized parameters from the sets of random disturbances according to the long-term behavioral revenues of the users obtained by statistics, and update the to-be-optimized parameters based on the determined evolution direction. An optimal evolution direction is actually maximized by attempting disturbances in various directions so as to maximize the long-term behavioral revenues of the users.

The iterative updates may be performed in a loop, which may be a continuous process. That is, iterative optimization is constantly performed as the recommendation system recommends content to the users online. However, since the parameters are actually gradually optimized after constant iterative optimization, the degree of optimization is already low. Continuous optimization of parameters is required only because some user states and social states change. Therefore, a learning rate of evolutionary learning can be reduced. A specific value of the learning rate may be a trial value or an empirical value.

It is also possible to stop iterative update after the iterative update reaches a certain extent and perform the iterative update in a loop next time the iteration update is started, until it reaches a certain extent. The certain extent may be that the recommendation system meets a convergence condition, for example, the long-term behavioral revenue of the user gradually converges; or may be that the number of alternate rounds reaches a preset round number threshold.

The above recommendation system may be a recommendation system pre-obtained by supervised learning or by a combination of supervised learning and artificial rules.

According to an embodiment of the present disclosure, the present disclosure further provides an electronic device and a readable storage medium.

Figure 5:
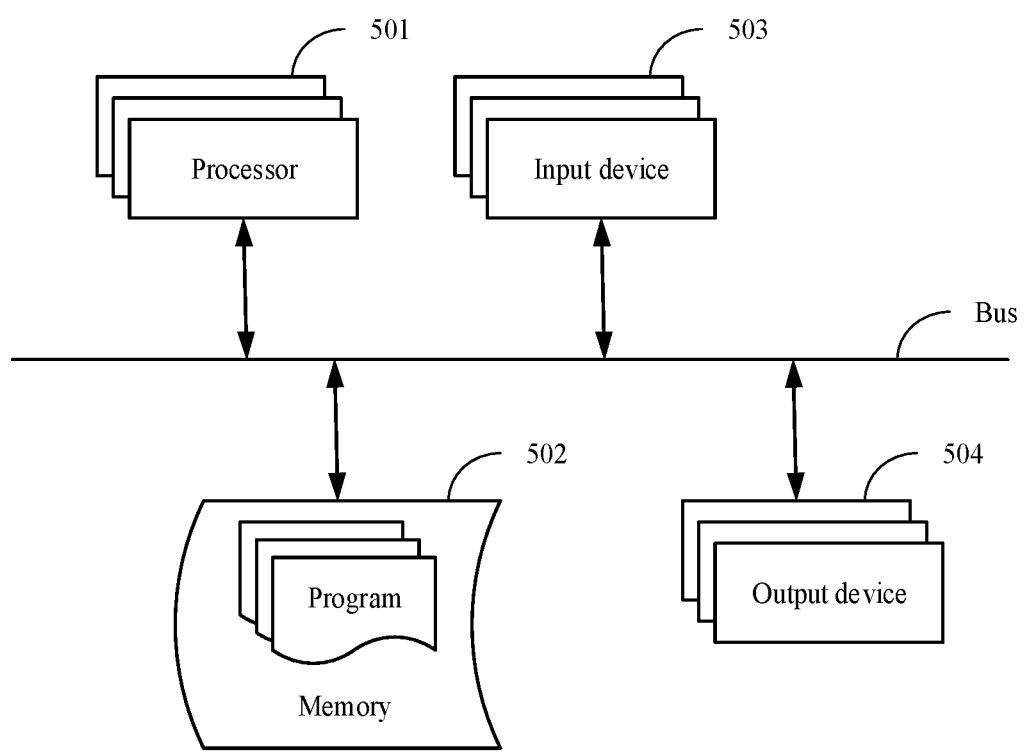
FIG. 5 is a block diagram of an electronic device for implementing an embodiment of the present disclosure.

As shown in FIG. 5, it is a block diagram of an electronic device of a method for optimizing a recommendation system according to an embodiment of the present disclosure. The electronic device are intended to represent various forms of digital computers, such as laptops, desktops, workbenches, personal digital assistants, servers, blade servers, mainframe computers and other suitable computers. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 5, the electronic device includes: one or more processors 501, a memory 502, and interfaces for connecting various components, including high-speed and low-speed interfaces. The components are connected to each other by using different buses and may be mounted on a common motherboard or otherwise as required. The processor may process instructions executed in the electronic device, including instructions stored in the memory or on the memory to display graphical information of a GUI on an external input/output device (such as a display device coupled to the interfaces). In other implementation modes, multiple processors and/or multiple buses may be used together with multiple memories and types of memory, if necessary. Similarly, a plurality of electronic devices may be connected, each of which provides some necessary operations (for example, as a server array, a set of blade servers, or a multiprocessor system). One processor 501 is taken as an example is FIG. 5.

The memory 502 is the non-transitory computer-readable storage medium provided in the present disclosure. The memory stores instructions executable by at least one processor to make the at least one processor perform the method for optimizing a recommendation system provided in the present disclosure. The non-transitory computer-readable storage medium in the present disclosure stores computer instructions. The computer instructions are used to make a computer perform the method for optimizing a recommendation system provided in the present disclosure.

The memory 502, as a non-transitory computer-readable storage medium, may be configured to store non-transitory software programs, non-transitory computer executable programs and modules, for example, program instructions/modules corresponding to the method for optimizing a recommendation system provided in the present disclosure. The processor 501 runs the non-transitory software programs, instructions and modules stored in the memory 502 to execute various functional applications and data processing of a server, that is, to implement the method for optimizing a recommendation system in the above method embodiment.

The memory 502 may include a program storage area and a data storage area. The program storage area may store an operating system and an application required by at least one function; and the data storage area may store data created according to use of the electronic device. In addition, the memory 502 may include a high-speed random access memory, and may further include a non-transitory memory, for example, at least one disk storage device, a flash memory device, or other non-transitory solid-state storage devices. In other embodiments, the memory 502 optionally includes memories remotely disposed relative to the processor 501. The memories may be connected to the electronic device over a network. Examples of the network include, but are not limited to, the Internet, intranets, local area networks, mobile communication networks and combinations thereof.

The electronic device may further include: an input device 503 and an output device 504. The processor 501, the memory 502, the input device 503 and the output device 504 may be connected through a bus or in other manners. In FIG. 5, the connection through a bus is taken as an example.

The input device 503 may receive input numerical information or character information, and generate key signal input related to user setting and function control of the electronic device, for example, input device such as a touch screen, a keypad, a mouse, a trackpad, a touch pad, a pointer, one or more mouse buttons, a trackball, and a joystick. The output device 504 may input a display device, an auxiliary lighting device (e.g., an LED) and a tactile feedback device (e.g., a vibration motor). The display device may include, but is not limited to, a liquid crystal display (LCD), a light-emitting diode (LED) display and a plasma display. In some implementation modes, the display device may be a touch screen.

Various implementation modes of the systems and technologies described here can be implemented in a digital electronic circuit system, an integrated circuit system, an ASIC (application-specific integrated circuit), computer hardware, firmware, software, and/or combinations thereof. The various implementation modes may include: being implemented in one or more computer programs, wherein the one or more computer programs may be executed and/or interpreted on a programmable system including at least one programmable processor, and the programmable processor may be a special-purpose or general-purpose programmable processor, receive data and instructions from a storage system, at least one input device and at least one output device, and transmit the data and the instructions to the storage system, the at least one input device and the at least one output device.

The computing programs (also referred to as programs, software, software applications, or code) include machine instructions for programmable processors, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disc, a memory, and a programmable logic device (PLD)) configured to provide machine instructions and/or data to a programmable processor, including a machine-readable medium that receives machine instructions serving as machine-readable signals. The term "machine-readable signal" refers to any signal for providing the machine instructions and/or data to the programmable processor.

To provide interaction with a user, the systems and technologies described here can be implemented on a computer. The computer has: a display device (e.g., a CRT (cathode-ray tube) or an LCD (liquid crystal display) monitor) for displaying information to the user; and a keyboard and pointing device (e.g., a mouse or trackball) through which the user may provide input for the computer. Other kinds of apparatuses may also be configured to provide interaction with the user. For example, a feedback provided for the user may be any form of sensory feedback (for example, visual, auditory, or tactile feedback); and input from the user may be received in any form (including sound input, voice input, or tactile input).

The systems and technologies described here can be implemented in a computing system including background components (for example, as a data server), or a computing system including middleware components (for example, an application server), or a computing system including front-end components (for example, a user computer with a graphical user interface or web browser through which the user can interact with the implementation mode of the systems and technologies described here), or a computing system including any combination of such background components, middleware components or front-end components. The components of the system can be connected to each other through any form or medium of digital data communication (for example, a communication network). Examples of the communication network include: a local area network (LAN), a wide area network (WAN), and the Internet.

The computer system may include a client and a server. The client and the server are generally far away from each other and generally interact via the communication network. A relationship between the client and the server is generated through computer programs that run on a corresponding computer and have a client-server relationship with each other.

The above specific implementation mode does not limit the extent of protection of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the extent of protection of the present disclosure.

What is claimed is:

1. A computer-implemented method for optimizing a recommendation system for a network service platform, wherein the network service platform comprises a search platform, an information platform, a shopping platform, or a music platform, comprising:
    taking the recommendation system as an agent, a plurality of users of the network service platform as an environment, each recommended content of the recommendation system as an action of the agent, and a long-term behavioral revenue of the user as a reward of the environment; and
    optimizing to-be-optimized parameters in the recommendation system by reinforcement learning to maximize the reward of the environment,
    wherein the to-be-optimized parameters comprise: at least a part of model parameters and/or hyper-parameters in the recommendation system,
    wherein the reinforcement learning comprises evolutionary learning; and
    the optimizing to-be-optimized parameters in the recommendation system comprises more than one round of iterative update, wherein each round of iterative update comprises:
    generating a set of random disturbances for each user;
    adding the set of random disturbances to the to-be-optimized parameters, the added random disturbances having the same dimension as the to-be-optimized parameters;
    conducting statistics on long-term behavioral revenues of the users after content is recommended to the users based on the recommendation system to which the random disturbances have been added; and
    determining an evolution direction of the to-be-optimized parameters from the sets of random disturbances according to the long-term behavioral revenues of the users obtained by statistics, and updating the to-be-optimized parameters based on the determined evolution direction.

2. The method according to claim 1, wherein the iterative update is performed in a loop; or the iterative update is performed till the recommendation system meets a convergence condition; or the iterative update is performed till the number of rounds of iteration reaches a preset round number threshold.

3. The method according to claim 1, wherein the recommendation system is a recommendation system pre-obtained by a supervised learning or by a combination of supervised learning and manual rules.

4. The method according to claim 1, wherein the long-term behavioral revenue of the user comprises:

total time spent by the user in using a service to which the recommendation system belongs, the total number of clicks or the total click rate of the user for the content recommended by the recommendation system, a promotion conversion rate of the user in the recommendation system, or a user retention rate for the service to which the recommendation system belongs.

5. An electronic device, comprising:

at least one processor; and a memory communicatively connected with the at least one processor;

wherein the memory stores instructions executable by the at least one processor, and the instructions are executed by the at least one processor to enable the at least one processor to perform a method for optimizing a recommendation system for a network service platform, wherein the network service platform comprises a search platform, an information platform, a shopping platform, or a music platform, wherein the method comprises:

taking the recommendation system as an agent, a plurality of users of the network service platform as an environment, each recommended content of the recommendation system as an action of the agent, and a long-term behavioral revenue of the user as a reward of the environment; and optimizing to-be-optimized parameters in the recommendation system by reinforcement learning to maximize the reward of the environment, wherein the to-be-optimized parameters comprise: at least a part of model parameters and/or hyper-parameters in the recommendation system, wherein the reinforcement learning comprises evolutionary learning; and the optimizing to-be-optimized parameters in the recommendation system comprises more than one round of iterative update, wherein each round of iterative update comprises:

generating a set of random disturbances for each user;

adding the set of random disturbances to the to-be-optimized parameters, the added random disturbances having the same dimension as the to-be-optimized parameters;

conducting statistics on long-term behavioral revenues of the users after content is recommended to the users based on the recommendation system to which the random disturbances have been added; and determining an evolution direction of the to-be-optimized parameters from the sets of random disturbances according to the long-term behavioral revenues of the users obtained by statistics, and updating the to-be-optimized parameters based on the determined evolution direction.

6. The electronic device according to claim 5, wherein the iterative update is performed in a loop; or the iterative update is performed till the recommendation system meets a convergence condition; or the iterative update is performed till the number of rounds of iteration reaches a preset round number threshold.

7. The electronic device according to claim 5, wherein the recommendation system is a recommendation system pre-obtained by a supervised learning or by a combination of supervised learning and manual rules.

8. The electronic device s according to claim 5, wherein the long-term behavioral revenue of the user comprises:

total time spent by the user in using a service to which the recommendation system belongs, the total number of clicks or the total click rate of the user for the content recommended by the recommendation system, a promotion conversion rate of the user in the recommendation system, or a user retention rate for the service to which the recommendation system belongs.

9. A non-transitory computer-readable storage medium storing computer instructions therein, wherein the computer instructions are used to cause the computer to perform a method for optimizing a recommendation system for a network service platform, wherein the network service platform comprises a search platform, an information platform, a shopping platform, or a music platform, wherein the method comprises:

taking the recommendation system as an agent, a plurality of users of the network service platform as an environment, each recommended content of the recommendation system as an action of the agent, and a long-term behavioral revenue of the user as a reward of the environment; and optimizing to-be-optimized parameters in the recommendation system by reinforcement learning to maximize the reward of the environment, wherein the to-be-optimized parameters comprise: at least a part of model parameters and/or hyper-parameters in the recommendation system, wherein the reinforcement learning comprises evolutionary learning; and the optimizing to-be-optimized parameters in the recommendation system comprises more than one round of iterative update, wherein each round of iterative update comprises:

generating a set of random disturbances for each user;

adding the set of random disturbances to the to-be-optimized parameters, the added random disturbances having the same dimension as the to-be-optimized parameters;

conducting statistics on long-term behavioral revenues of the users after content is recommended to the users based on the recommendation system to which the random disturbances have been added; and determining an evolution direction of the to-be-optimized parameters from the sets of random disturbances according to the long-term behavioral revenues of the users obtained by statistics, and updating the to-be-optimized parameters based on the determined evolution direction.

10. The non-transitory computer-readable storage medium according to claim 9, wherein the iterative update is performed in a loop; or the iterative update is performed till the recommendation system meets a convergence condition; or the iterative update is performed till the number of rounds of iteration reaches a preset round number threshold.

11. The non-transitory computer-readable storage medium according to claim 9, wherein the recommendation system is a recommendation system pre-obtained by a supervised learning or by a combination of supervised learning and manual rules.

12. The non-transitory computer-readable storage medium according claim 9, wherein the long-term behavioral revenue of the user comprises:

total time spent by the user in using a service to which the recommendation system belongs, the total number of clicks or the total click rate of the user for the content recommended by the recommendation system, a promotion conversion rate of the user in the recommendation system, or a user retention rate for the service to which the recommendation system belongs.

* * * * *